2,796,444
PROCESS FOR PREPARING METHYLENE BIS PHENOLS

Frank A. V. Sullivan, Glenbrook, Conn., assignor to American Cyanamid Company, New York, N. Y., a corporation of Maine No Drawing. Application November 4, 1954,
Serial No. 466,944

9 Claims. (Cl. 260—619)

This invention is concerned with antioxidants. More particularly, it is concerned with 2,2'-methylene-bis-4,6-dialkyl phenols useful as rubber antioxidants. Still more particularly, it is concerned with a new and improved method of preparing 2,2' - methylene - bis - 4,6 - dialkyl phenols.

In the commercial manufacture of various products, it is necessary to include in the formulation, materials which render the whole resistant to deterioration by the action of oxygen. An excellent illustration is the compounding and vulcanization of rubber. Vulcanized products quickly develop altered properties after exposure to oxygen. The rate of deterioration, of course, is dependent upon the oxygen content of the atmosphere in which they are exposed, as well as the temperature, pressure, the presence or absence of sunlight, and the like.

In the manufacture of vulcanized rubber products, various chemical compounds have been employed as antioxidants. Among those which have been found to be particularly outstanding is the class of 2,2'-methylene-bis-4,6-dialkyl phenols. This class of compounds may be represented by the formula

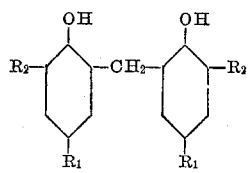

in which $R_1$ is a straight-chain alkyl radical of from 1 to 3 carbon atoms and $R_2$ is a tertiary alkyl radical of from 4 to 8 carbon atoms.

Although this class of compounds is unusually successful as rubber antioxidants, the use thereof has been somewhat restricted because of difficulties encountered in preparation. These compounds have heretofore been prepared by reacting the corresponding dialkyl phenol with formaldehyde in the presence of an organic solvent, for instance, heptane, and an acidic catalyst such as sulfuric acid. This procedure, however, is subject to certain disadvantages. For instance, the yield of product is not as high as desired. Similarly, a product of high purity is difficult to obtain unless highly purified starting materials are employed. For use as rubber antioxidants, these products must be in a powder form to allow for easy and thorough dispersion during milling. According to the above procedure, particle size cannot be controlled and the product is usually obtained as large agglomerates. Such an agglomerated product must be subjected to purification and then micropulverized into a form suitable for milling. Still further, the described procedure requires handling and recovery of large volumes of organic solvent.

It is the primary object of this invention, therefore, to provide a process for preparing 2,2'-methylene-bis-4,6-dialkyl phenols for use as rubber antioxidants which is not subject to these various disadvantages. Such a procedure should give a high purity product in high yield. It should be capable of such control as to give a product in a particle size range which allows for thorough dispersion during rubber compounding without first being subjected to size reduction. Particularly, such a process should not require the use and attendant recovery of large volumes of organic solvents.

Surprisingly, the desired objects of this invention have been accomplished by conducting the above described reaction of a dialkyl phenol and formaldehyde in an aqueous medium in the presence of an acid catalyst and a suitable dispersing agent. The dialkyl phenol and formaldehyde are brought together in a heated aqueous mixture comprising a catalyst and dispersing agent and the elevated temperature maintained for sufficient time to complete the reaction. The reaction mass is then cooled and the solid product separated from the reaction medium.

While the process of this invention has been quite simply stated, nevertheless, optimum results depend on the observance of certain factors. For instance, although the water serves only as a reaction medium and not as a solvent for the dialkyl phenol, the amount of water employed should be controlled within certain limits. Of course, at least sufficient water should be provided to avoid formation of an unmanageable mass and allow for agitation. It has been found that at least about 150 ml./mol of dialkyl phenol should be employed to permit adequate agitation during reaction. Preferably, the amount should be 200 ml. per mol of dialkyl phenol and may be considerably more. However, little if any added advantage is gained by increasing the amount much beyond about 300 ml./mol of dialkyl phenol.

It has been observed, moreover, that an excessive amount of water influences the particle size of the final product. When employing more than about 350 ml./mol of dialkyl phenol, the particle size of the product begins to approach that which is difficult to adequately disperse during rubber milling. Moreover, excessive amounts of water tend to eliminate the advantage of increased reaction vessel capacity gained by employing an aqueous medium rather than an organic solvent. Accordingly, the amount of water employed should range from about 150–350 ml./mol of dialkyl phenol, and preferably from about 200–250 ml./mol of dialkyl phenol. After reaction is complete, it may be desirable to increase the water content to facilitate separation of the solid product.

Various acid catalysts may be employed, but, in general the catalyst will be either sulfuric or hydrochloric acid. Of these, sulfuric acid is preferred and will be employed in varied amounts depending upon the acid strength. For instance, when using 96% sulfuric acid, the amount of acid may vary from about 2 grams to about 9 grams/mol of dialkyl phenol. Less than about 2 grams, however, is inadequate and results in a substantial lowering of the yield. On the other hand, more than about 9 grams results in no added advantage. A preferred range of 96% sulfuric acid is about 4 to 7 grams/mol of dialkyl phenol. Aryl sulfonic acids may be employed and have the advantage over sulfuric acid that the reaction may be conducted in iron reaction vessels rather than glass lined vessels. However, any advantage gained is not warranted by the increased cost attributed to the use of aryl sulfonic acids.

In conducting the process of this invention it is necessary to employ a dispersing agent for the dialkyl phenol. Such dispersing agent must be one which is not subject to hydrolysis or is otherwise affected in acidic aqueous solutions. Among those compounds which have been found to be particularly suitable are sodium alkyl toluene sulfonates in which the aliphatic side chain contains at least 10 carbon atoms, preferably 10–12 carbon atoms, for example, sodium decyl toluene sulfonate, and sodium dialkyl naphthalene sulfonates in which the two aliphatic side chains contain at least 5 carbon atoms, for example, sodium diamyl naphthalene sulfonate. These classes of compounds have been found to successfully disperse the dialkyl phenol in such a form that it will readily condense with the formaldehyde. The amount of dispersing agent employed may vary quite widely and will depend to some extent on the particular dispersing agent employed. In general, however, it has been found that from about 0.5 to about 1.5 grams of dispersing agent per mol of dialkyl phenol gives good results. While lesser or greater amounts may be employed, if desired, it has been found that the required dispersion is not obtained with lesser amounts while greater amounts show no added advantage.

The process of this invention is conducted by adding, with agitation, the dialkyl phenol to a mixture of formaldehyde, acid catalyst, dispersing agent, and water, preferably at an elevated temperature, over an extended period of time. After addition of the dialkyl phenol is complete agitation is continued until reaction is substantially complete. While the reaction proceeds more rapidly at elevated temperatures, little if any added advantage is gained by operating above about 90° C. Sodium hydroxide or other suitable neutralizing agent may then be introduced and the entire contents drowned in water. The reaction mass is then centrifuged or otherwise treated to effect a separation of the solid product. The separated product is then washed with water to free it of sulfates and dried.

The following examples will further demonstrate the process of this invention. These examples are intended as illustrative only and not by way of limitation. Unless otherwise noted all parts are by weight. The first example represents the prior art procedure using an organic solvent.

Example 1

82 parts of 2-tert-butyl-4-methyl phenol was suspended in 100 parts of heptane and 10 parts of concentrated hydrochloric acid added together with 1 part of sodium lauryl sulfate. 23 parts of a 37% formalin solution containing 0.275 mol of formaldehyde were then run in allowing the temperature to rise autogenously. The reaction mixture in highly emulsified state was then digested at 50–60° C. for three hours. While still warm the aqueous layer was separated from the reaction mixture and the non-aqueous layer cooled to room temperature. 87% yield of 2,2'-methylene-bis-(4-methyl-6-tertiary butyl phenol) was obtained as agglomerates having a melting point of 125°–128° C.

Example 2

To a mixture comprising 1000 parts of water, 45 parts of 96% sulfuric acid, 212.5 parts of an aqueous 37% formalin solution and 15 parts of a 50% sodium diamyl naphthalene sulfonate solution was added 820 parts of 2-tert-butyl-4-methyl phenol over a period of 1 hour at a temperature of 75°–90° C. This temperature was maintained for another hour followed by cooling, filtering, washing and drying of the solid product. A yield of 99.9% 2,2'-methylene-bis-(4-methyl-6-tertiary butyl phenol) in crystalline form was obtained having a melting point of 124–127° C.

Example 3

The procedure of Example 2 was repeated except 25 parts of sodium decyl toluene sulfonate was employed as the dispensing agent, the addition of 2-tert-butyl-4-methyl phenol made over a period of 90 minutes and heating continued for another ninety minutes after addition completed. 99.1% yield of crystalline 2,2'-methylene-bis-(4-methyl-6-tertiary butyl phenol) was obtained having a melting point of 128–130° C. and having a good color.

Example 4

The procedure of Example 3 was repeated using 25 parts of p-toluene sulfuric acid as catalyst. After washing and drying a yield of 98.7% of crystalline 2,2'-methylene-bis-(4-methyl-6-tertiary butyl phenol) was obtained melting at 125°–129° C.

Example 5

To a mixture comprising 402 parts of water, 4.1 parts of sodium decyl toluene sulfonate, 10.1 parts of 97% $H_2SO_4$ and 80 parts of 37% formalin was added 328 parts of 2-tert-butyl-4-ethyl phenol over a period of 90 minutes at 80°–90° C. and the temperature maintained for an additional 3 hours. The reaction mixture was cooled and 26.7 parts of NaOH added followed by separation, washing and drying of the crystalline product. A 98% yield of 2,2'-methylene-bis-(4-ethyl-6-tertiary butyl phenol) was obtained, melting point 121°–123° C.

Example 6

To a mixture comprising 57 parts water, 0.5 part sodium decyl toluene sulfonate, 1.4 parts 97% $H_2SO_4$ and 8.1 parts of 37% formalin was added 46.8 parts of 2-tertiary-octyl-4-ethyl phenol over a period of one hour at 90° C. and the temperature maintained for another two hours. The reaction mixture was then neutralized with 20% NaOH solution and cooled. The white granular product was separated, washed and dried. Crystals of 2,2'-methylene-bis-(4-ethyl-6-tertiary octyl phenol) in 98.2% yield were obtained, melting point 69°–71° C.

What is claimed is:

1. A method of preparing 2,2'-methylene-bis-4,6-dialkyl phenols of the formula

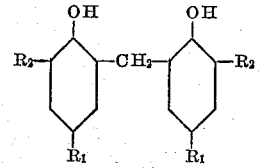

wherein $R_1$ is an alkyl radical of 1–3 carbon atoms and $R_2$ is a tertiary alkyl radical of 4–8 carbon atoms which comprises: reacting in an aqueous medium a dialkyl substituted phenol and formaldehyde, said aqueous medium comprising any water present through the use of formaldehyde as an aqueous solution plus at least 150 ml./mol of dialkyl phenol, said medium containing during said reaction a catalytic amount of an acid and a dispersing agent.

2. A method according to claim 1 in which the dispersing agent is a sodium alkyl toluene sulfonate in which the aliphatic side chain contains at least 10 carbon atoms.

3. A method according to claim 2 in which the dispersing agent is sodium decyl toluene sulfonate.

4. A method according to claim 1 in which the dispersing agent is a sodium dialkyl naphthalene sulfonate in which each aliphatic side chain contains at least 5 carbon atoms.

5. A method according to claim 4 in which the dispersing agent is sodium diamyl naphthalene sulfonate.

6. A method according to claim 1 in which the dialkyl phenol is 2-tert-butyl-4-methyl phenol.

7. A method according to claim 1 in which the dialkyl phenol is 2-tert-butyl-4-ethyl phenol.

8. A method according to claim 1 in which the dialkyl phenol is 2-tert-octyl-4-ethyl phenol.

9. A process according to claim 1 in which the formaldehyde, acid catalyst and dispersing agent are added to the water, resultant mixture heated to a temperature not exceeding about 90° C. and the dialkyl phenol then added to the heated mixture.

References Cited in the file of this patent

UNITED STATES PATENTS

| | | |
|---|---|---|
| 1,977,627 | Greenhalgh | Oct. 23, 1934 |
| 2,330,217 | Hunn | Sept. 28, 1943 |
| 2,430,002 | De Groote et al. | Nov. 4, 1947 |
| 2,504,064 | Bock et al. | Apr. 11, 1950 |
| 2,675,366 | Pullman | Apr. 13, 1954 |

FOREIGN PATENTS

| | | |
|---|---|---|
| 711,122 | Great Britain | June 23, 1954 |